United States Patent
Sack

(10) Patent No.: US 10,027,104 B2
(45) Date of Patent: Jul. 17, 2018

(54) ELECTRONIC CIRCUIT ARRANGEMENT

(71) Applicant: ECOM Instruments GmbH, Assamstadt (DE)

(72) Inventor: Norbert Sack, Lauda-Koenigshofen (DE)

(73) Assignee: ECOM INSTRUMENTS GMBH (DE)

( * ) Notice: Subject to any disclaimer, the term of this patent is extended or adjusted under 35 U.S.C. 154(b) by 864 days.

(21) Appl. No.: 14/540,027

(22) Filed: Nov. 12, 2014

(65) Prior Publication Data

US 2015/0130295 A1     May 14, 2015

(30) Foreign Application Priority Data

Nov. 13, 2013 (DE) .................. 10 2013 223 141

(51) Int. Cl.
| | |
|---|---|
| *H02H 3/08* | (2006.01) |
| *H01H 83/00* | (2006.01) |
| *H02H 3/06* | (2006.01) |
| *H02H 9/00* | (2006.01) |
| *H02H 3/093* | (2006.01) |
| *H02H 7/18* | (2006.01) |

(52) U.S. Cl.
CPC ............. *H02H 3/08* (2013.01); *H02H 3/06* (2013.01); *H02H 3/093* (2013.01); *H02H 7/18* (2013.01); *H02H 9/001* (2013.01); *H02H 9/008* (2013.01); *Y10T 307/865* (2015.04)

(58) Field of Classification Search
CPC H02H 3/08; H02H 3/06; H02H 3/093; H02H 7/18; H02H 9/001; H02H 9/008; Y10T 307/865
USPC ......................................................... 307/131
See application file for complete search history.

(56) References Cited

U.S. PATENT DOCUMENTS

| | | |
|---|---|---|
| 6,127,882 A | 10/2000 | Vargha et al. |
| 6,956,726 B2 | 10/2005 | Hsu et al. |
| 7,872,846 B2 | 1/2011 | Titschert et al. |

(Continued)

FOREIGN PATENT DOCUMENTS

| | | |
|---|---|---|
| DE | 2937298 A1 | 4/1981 |
| DE | 3346435 A1 | 8/1985 |

(Continued)

OTHER PUBLICATIONS

Search Report for EP Application No. 14192838, dated Jun. 19, 2015, 2 pp.
German Office Action for DE102013223141.5, dated Apr. 17, 2014.

*Primary Examiner* — Hal Kaplan
(74) *Attorney, Agent, or Firm* — Fishman Stewart PLLC

(57) ABSTRACT

An electronic circuit arrangement may include a first supply line and a second supply line which are connectable with an electric energy supply unit at a first supply line input connection and a second supply line input connection. The first supply line and the second supply line may be electrically connectable at a first supply line output connection and a second supply line output connection with an external electronic device for supply of electric energy. The arrangement may include a switching element provided in the first supply line. The switching element may be switched between an opened state, in which the switching element electrically interrupts flow of an electrical current in the first supply line, and a closed state, in which the electrical current flows uninterrupted. The electronic circuit arrangement may include a first electronic circuit, a second electronic circuit, and a third electronic circuit.

18 Claims, 2 Drawing Sheets

(56) References Cited

U.S. PATENT DOCUMENTS

2010/0027180 A1 2/2010 Bingel et al.
2015/0092310 A1 4/2015 Sack

FOREIGN PATENT DOCUMENTS

| DE | 243130 C | 2/1987 |
|---|---|---|
| DE | 102005004554 A1 | 8/2006 |
| GB | 2152305 A | 7/1985 |

ELECTRONIC CIRCUIT ARRANGEMENT

CROSS-REFERENCE TO RELATED APPLICATIONS

This application claims priority to German Patent Application No. 10 2013 223 141.5, filed Nov. 13, 2013, the contents of which are hereby incorporated by reference in their entirety.

TECHNICAL FIELD

The present invention relates to an electronic circuit arrangement for use in potentially explosive atmospheres as well as to an electronic module with such an electronic circuit arrangement. The invention further relates to an electronic system with such an electronic module.

BACKGROUND

In potentially explosive atmospheres such as on oil rigs or similar, mobile electronic devices such as mobile telephones or laptops are often used, which for the supply of electric energy can be connected via an appropriate external interface to a separate energy supply unit. In order to avoid an unwanted glow or spark ignition the battery or the electronic device can be equipped with a special electronic protective circuit. Such an electronic protective circuit may comprise circuits for limiting the electric current or energy, which prevent excessively high electric currents or energies from being present at the said electronic interface with the outside. Such an interface, in particular when using electronic devices in potentially explosive atmospheres, represents a special risk, because there is a danger that due to the electric energy present at the connection elements of the interface the possibly existing gas-air mixture may be ignited by a glow or spark ignition in the potentially explosive atmosphere.

The danger of a spark ignition primarily consists in that when the electric current present at the interface in the form of a current pulse or similar quickly rises over time. Such electric current pulses can occur in normal operation of the battery or the electronic device connected to the battery. A similar effect is achieved, when the electric poles of the battery—i.e. the minus and plus poles—provided at the interface are short-circuited, which in turn leads to a very quickly rising electric short-circuit current. An electric short-circuit can, as is known, be generated if an electric connection is inadvertently established between said battery poles; alternatively an error condition in the electronic device connected with the battery may be the cause of an electric short-circuit.

What can also happen is a glow ignition if the components of the battery or the electronic device including said interface between the battery and the electronic device become excessively hot. Such a warm-up may be the consequence of an inadmissibly high electric supply current between the battery and the electronic device, if this current exceeds the specified upper limit. Short-term current fluctuations or current pulses on the other hand, are unimportant with regard to an unwanted occurrence of a glow ignition.

In order to prevent the occurrence of a glow or spark ignition at the interface provided between the battery and the electronic device, the said electronic protective circuits must be designed in such a way that on the one hand, they react to a slow rise in the electric current beyond an admissible maximum value, but on the other hand, in the event of quick, pulse-like current fluctuations, guarantee a switch-off of the supply line. In addition the protective circuit must be able to detect, and prevent, an electric short-circuit in the battery or in the electronic device, which is supplied with electric energy from the battery.

SUMMARY

The present invention therefore addresses the problem of proposing an improved embodiment for an electronic circuit arrangement by means of which a spark or glow ignition at its external interfaces can be avoided.

This problem is solved by the subject of the independent claims. Preferred embodiments are the subject of the dependent claims.

The present invention tackles the problem of avoiding both a glow ignition as well as a spark ignition in an electronic device and/or a battery supplying the electronic device with electric energy by having the idea of providing an electronic circuit arrangement with three different protective circuits, each of which is individually tuned to reliably avoid the occurrence of inadmissibly high currents or energies in the supply line between battery and electronic device and therefore also at the interface between battery and electronic device. The configuration of the electronic circuit arrangement with three different protective circuits, each of different design, encourages the suppression of different kinds of inadmissible electric currents, which as described above are based on different causes and which are different from each other as regards their maximum value and their progression over time, which for example may increase monotonously or may comprise a pulse-like progression.

Such a suppression of inadmissible electric currents in the supply line is effected in any case by switching a switching element provided in the supply line into an opened state, in which the electrical supply line is interrupted preventing the flow of electric current. In such an electrically interrupted state of the supply line no potentially explosive energy is available at the interface between battery and electronic device resulting in the entire arrangement of battery, inventive circuit arrangement and electronic device assuming an explosion-safe state.

According to the invention a first electronic circuit is configured such that it switches the switching element from the closed into the opened state when the electric current flowing through the first supply line exceeds at least a predefined first threshold value for a predefined time duration. This prevents the maximum admissible electric current in the supply line from being exceeded for any length of time and thus the circuit arrangement from heating up and thereby encouraging a glow ignition. On the other hand the first circuit arrangement is not designed to react to short-term current fluctuations such as "spikes" as they can regularly occur on electronic components even in nominal operation. This requirement is met by the second electronic circuit according to the invention. This circuit is configured such that it switches the switching element from the closed into the opened state, when the electronic current flowing through the first supply line exceeds a predefined second threshold value and, after falling below the second value—such a drop below the second threshold value occurs automatically due to the interrupted state of the supply line—switches it back into the closed state. In this way unwanted current peaks promoting a spark ignition in the supply line, which o. a. can be generated when the electronic device is connected to the battery via the electronic circuit arrangement, can be avoided. Since the second electronic circuit opens the switching element immediately after exceeding the second threshold value and causing an electric interruption in the supply line, the current drops very quickly again below the second threshold value within a very short time, and the interruption of the electric connection is cancelled. A particularly preferred design of the second circuit arrangement consists in that the said electrical interruption lasts for only a few microseconds. Such a short-term interruption of the current flow through the supply line does not have a negative effect upon the functionality of the electronic components in the electronic device including the phase in which there is no connectivity between battery and electronic device. The second electronic circuit thus allows the suppression of short electric current pulses without affecting an associated interrupted electrical connection between the electronic device and the battery. This, by means of the two circuits just described, has the effect of preventing a slow increase beyond a threshold value or the occurrence of high-frequency pulses.

In order to avoid that as a result of a lasting electric short-circuit occurring in the electronic device, the switching element is constantly switched (like a clock ticking) between the opened and the closed state, a third electronic circuit is provided according to the invention. The third electronic circuit switches the switching element from the closed into the opened state as soon as the electric current flowing through the first supply line exceeds a predefined third threshold value for a predefined third time duration, which value is greater than the first threshold value of the first circuit. The third circuit realizes a short-circuit protective function in that it switches the switching element from the closed into the opened state as soon as the electric current flowing through the first supply line exceeds the said third threshold value which is greater than the first threshold value of the first circuit, this for at least a predefined time period. In case—as a rule due to an error—the two electric supply lines and thus the battery itself short-circuit, care is taken to avoid that the two supply lines permanently exceed the electric short-circuit current beyond a critical maximum value—a fact which the slowly reacting first circuit arrangement compared to the third circuit arrangement—cannot prevent to an adequate degree.

With a preferred embodiment switching of the switching element from the closed into the opened state is effected by the second circuit within a second switch-over time duration which is smaller than a first switch-over duration needed by the first circuit for switching the switching element. In this way the occurrence of current pulses with particularly high peaks, which could lead to a spark ignition, is avoided, and the very quick switch-off or associated energy limitation of the electrical supply is ensured. The switch-over of the switching element from the closed into the opened state by the third circuit finally is effected within a third switch-over time duration which is smaller than the first switch-over time duration, but greater than the second switch-over time duration.

With a particularly preferred embodiment the first switch-over duration $T_1$ lies between 300 ms and 1 s. The second switch-over duration is fixed such that the electric energy transmitted during the second switch-over duration $T_2$ does not exceed 40 μJ. The third switch-over duration $T_3$ is approx. 40 ms.

Preferably the first circuit is designed such that the first threshold value lies between 1 A and 1.4 A, preferably 1.1 A, most preferably 1.14 A. Consequently the second and third circuits can be designed such that the second threshold value is approx. 6 A and the third threshold value is approx. 2.5 A. By fixing the second threshold value at 6 A relative to fixing the first threshold value to a value between 1 A and 1.4 A, it is ensured that the second circuit is not activated until a threshold current has been exceeded which lies distinctly above a value at which the first circuit is activated, which in order to avoid glow ignition, permanently deactivates the electrical supply line. Exceeding the third threshold value has the effect of preventing a very quick and permanent short-circuit-based increase of the electric current in the electronic device or in the battery. It is important to ensure a sufficiently big difference between the first and third threshold values in order to prevent the first and third circuits from being triggered at the same time.

To determine the electric current flowing through the supply line an electric current sensor may be provided in the first electrical supply line by means of which the electric current flowing through the electrical supply line can be determined. The current sensor can indicate the measured current value in the form of a suitable sensor output signal, for example in the form of a sensor output voltage provided at a signal output line. A variant which is particularly easy to implement from a technical point of view, recommends the use of a low-ohm resistance wherein the electric voltage lying across it is picked up, which is known to be in a linear relationship to the current flowing through the resistance.

In order to keep the number of components required for realising the first, second and third circuits and the associated production effort to a minimum, at least one of the three circuits—preferably all three circuits—may each comprise a comparator circuit which by comparing a predetermined reference voltage signal with the electric sensor output voltage provided by the current sensor generates a first electrical voltage signal, when the electric current flowing through the first supply line exceeds a predetermined first comparator threshold value. In all other cases a second voltage signal is generated which is different from the first. By individually fixing the comparator threshold value for each of the three circuits, it is possible to achieve the above-described triggering of the respective circuit, i.e. a switch-over of the switching element by one of the three said circuits into the opened state, if the threshold value of the electric current in the first supply line which is associated with the respective circuit, is exceeded.

Technically the respective comparator circuit may be realised with the aid of a comparator component such as an operational amplifier known to the expert skilled in the subject matter, whereby the comparator component is connected with the first input connection with an output connection of the current sensor at which the sensor output voltage is provided, and connected with a second input connection with a reference voltage source at which the reference voltage is provided. A first circuit logic is provided, which on the input side cooperates with the output connection of the comparator component and on the output side cooperates with the switching element, and this circuit logic switches the switching element into the opened state as soon as the first voltage signal is generated at the output connection.

Preferably the respective comparator circuit comprises a low-pass filter provided at the first input connection of the comparator component, and this acts as a low-pass upon the sensor output signal generated by the current sensor. This allows the filtering out of high-frequency components of the electric current by the supply line at a certain cut-off frequency which can be individually adapted to the respective circuit by using differently dimensioned RC members in the three circuits.

It is especially convenient if the RC member in the first circuit comprises a capacity $C_1$ of approx. 1 µF and an ohmic resistance $R_1$ of approx. 100 kOhm. Alternatively or additionally the RC member in the second circuit may comprise a capacity $C_2$ of approx. 100 pF and an ohmic resistance of approx. 1 kOhm. Again alternatively or additionally the RC member in the third circuit may comprise a capacity $C_3$ of approx. 1 nF and an ohmic resistance $R_3$ of approx. 10 kOhm. The term "approx." indicates that the actual values of individual parameters may deviate—at least by up to 1%—from the explicitly given values.

Further important features and advantages of the invention are revealed in the sub-claims, the drawings and the associated figure description with reference to the drawings.

It is understood that the features mentioned above and explained below can be used not only in the respectively mentioned combination but also in other combinations or on their own without leaving the scope of the present invention.

Preferred embodiments of the invention are depicted in the drawings and explained in detail in the description below, wherein identical reference symbols refer to identical or similar or functionally equal components.

BRIEF DESCRIPTION OF THE DRAWINGS

In the schematic drawings

DETAILED DESCRIPTION

Figure 1:
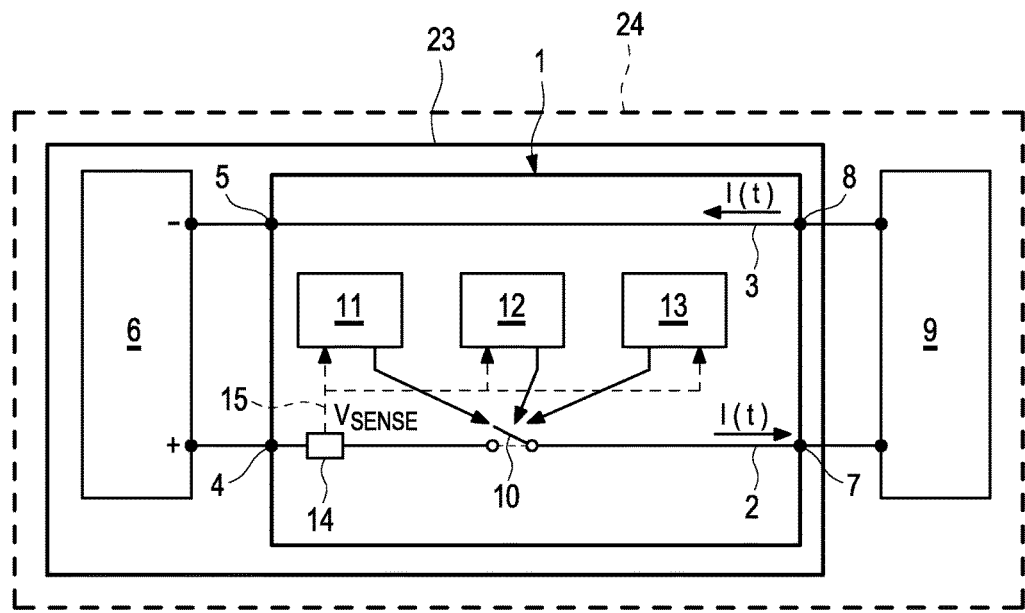
FIG. 1 shows a circuit diagram of an example of the circuit arrangement according to the invention.

An example of an inventive electronic circuit arrangement marked with 1 is shown in FIG. 1. This comprises a first and a second electrical supply line 2, 3, which are connected by means of a first or second supply line input connection 4, 5 with the electronic energy supply unit 6 in the form of a battery. An electronic device 9 can be connected to the two supply lines 2, 3 via a first and second supply line output connection 7, 8, and via the supply lines to the battery allowing the electronic device 9 to be supplied with electrical energy from the battery. The circuit arrangement 1 and the energy supply unit 6 form an electronic module 23, the module 23 and the electronic device form an electronic system 24.

The first supply line 2 includes a switching element 10 which can be switched between an opened state, in which it electrically interrupts the supply line 2, and a close state. The switch-over between the states is controlled independently by a first electronic circuit 11, a second electronic circuit 12 and third electronic circuit 13. All three circuits 11, 12, 13 switch the switching element 10 in dependence of the time progression of the electric current flow $1(t)$ through the supply line 2 into the opened state and from the opened state back into the closed state respectively.

Figure 2:
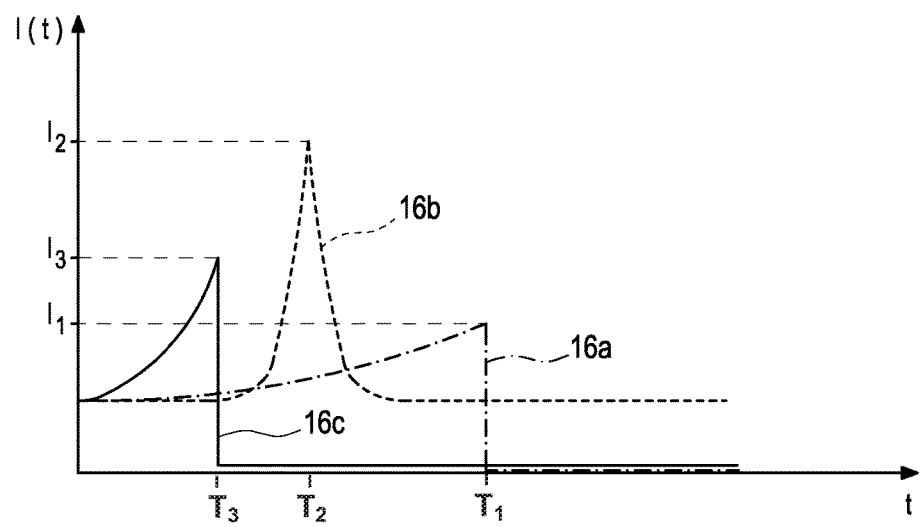
FIG. 2 shows various scenarios of the current progression through the electrical supply line of the circuit arrangement in a current-time diagram.

The first electronic circuit 11 is configured such that it switches the switching element from the closed into the opened state, when the electric current 1 flowing through the first supply line 2 exceeds a predefined first threshold value $1_1$ for a predefined first time duration $T_1$. This is depicted in the current-time diagram of FIG. 2 by way of the graph marked 16a. This prevents the maximum admissible electric current in the supply line 2 from being exceeded for any length of time and thus the circuit arrangement 1 including the battery from heating up and thereby encouraging a glow ignition. However, the first circuit arrangement 11 is not designed to react on short-term current fluctuations such as "spikes" or current pulses as they can regularly occur on electronic components even in nominal operation. This requirement is met by the second electronic circuit 12. This is designed such that it switches the switching element 10 from the closed into the opened state, when the electric current flowing through the first supply line 2 exceeds a predefined second threshold value $1_2$ and the switching element 10 returns into the close state once the current drops below the second threshold value $1_2$. The second threshold value $1_2$ is greater than the first threshold value $1_1$ as shown in FIG. 2 by way of the graph marked 16b. Typical values for the first threshold value $1_1$ approx. lie within an interval between 1 A and 1.4 A, preferably at 1.1 A, and for the second threshold value $1_2$ at approx. 6 A. The switch-over of the switching element 10 from the closed into the opened position by the second circuit takes place within a second switch-over time duration $T_2$, which is fixed such that during the second switch-over duration $T_2$ the transmitted electrical energy does not exceed 40 µJ. Typically such an amount of energy is connected with a time period in the one-digit microseconds range, for example approx. 1 µs. The switch-over of the switching element 10 into the opened state is effected by means of the second circuit 12 in such a quick fashion that the energy transmitted by the first supply line 2 is restricted to the desired maximum value. This becomes clear when comparing the second switch-over time duration $T_2$ of the second circuit 12 with the first switch-over time duration $T_1$ of the first circuit 11: $T_1$ typically lies between 300 ms and 1 s, $T_2$ lies, as already mentioned, in the one-digit microseconds range.

In the electrical supply line 2, it is thus possible to avoid short-term, spark-ignition-promoting current peaks, which typically can assume values of more than 6 A, as they could occur while connecting the electric device 9 via the electronic circuit arrangement 1 to the battery. Since the second electronic circuit 12 opens the switching element 10 immediately after exceeding the second threshold value $1_2$ thereby interrupting the first supply line 2, the current automatically drops again below the second threshold value $1_2$, so that the switching element 10 switches back into the closed state thereby cancelling the interruption of the electrical connection in the supply line 2. Said electrical interruption of the supply line 2 thus only lasts for a very short time span; given a suitable design of the second circuit arrangement 12 this is only a few microseconds. Such a short interruption of the electric current flow through the supply line 2 does not interfere with the operation of the electronic components fitted into the electronic device 9 during the phase when there is no connectivity of the electronic device 9 with the battery. The second electronic circuit 12 therefore allows the suppression of short electric current pulses without negatively affecting the operation of the electronic device 9 as a result of the interrupted energy supply.

The third electronic circuit 13 switches the switching element 10 into the opened state as soon as the electric current 1 flowing through the first supply line 2 exceeds a third threshold value $1_3$ which is greater than the first threshold value $1_1$ of the first circuit 11 and smaller than the second threshold value $1_2$ of the second circuit 12. The third circuit 13 realizes a function protecting against a short-circuit in that it switches the switching element 10 from the closed into the opened state as soon as the electric current 1 flowing through the first supply line 2 exceeds a predefined third threshold value $1_3$ which is greater than the first threshold value $1_1$ and smaller than the second threshold value $1_2$ of the second circuit 12.

This is shown in the current-time diagram of FIG. 2 by way of the graph marked 16c. In case of an electric short-circuit of the two electric supply lines 2, 3, which is usually due to an error, and thus to the electric battery itself, a quick increase in the electric short-circuit current beyond a critical maximum value through the two supply lines 2, 3 is avoided, a fact which the slowly reacting first circuit arrangement 11 compared to the third circuit arrangement 13—cannot prevent to an adequate extent. The reaction time $T_3$ of the third circuit, for a suitable design, is typically approx. 40 ms.

In the example of FIG. 1 the first circuit 10 is designed such that the first threshold value lies between 1 A and 1.4 A, preferably 1.1 A, most preferably approx. 1.14 A. According to the exemplary scenario the second and third circuits 12, 13 are designed such that the second threshold value is approx. 6 A and the third threshold value is approx. 2.5 A. By fixing the second threshold value at 6 A, compared to a first threshold value fixed between 1 A and 1.4 A, it is ensured that the second circuit 12 is not activated until a threshold current $1_2$ has been activated, which lies distinctly above a value $1_1$, at which the first circuit 11 is activated, which in order to avoid a glow ignition permanently deactivates the electrical supply line 2. When the third threshold value $1_3$ is exceeded, a short-circuit-based very quick and permanent increase in the electric current is prevented.

To determine the electric current 1 flowing through the supply line in the example of FIG. 1, an electric current sensor 14 is provided in the first electrical supply line 2, by means of which the electric current 1 flowing through the supply line 2 is determined. The current sensor 14 provides the measured current value in the form of a suitable sensor output signal, for example in the form of a sensor output voltage provided at a signal output line 15 for forwarding through the three circuits 11, 12, 13. In the simplest case the current sensor 14 may be configured as a low-ohm resistance, wherein the electric voltage across it is a measure for the electric current flowing through the resistance.

Figure 3:
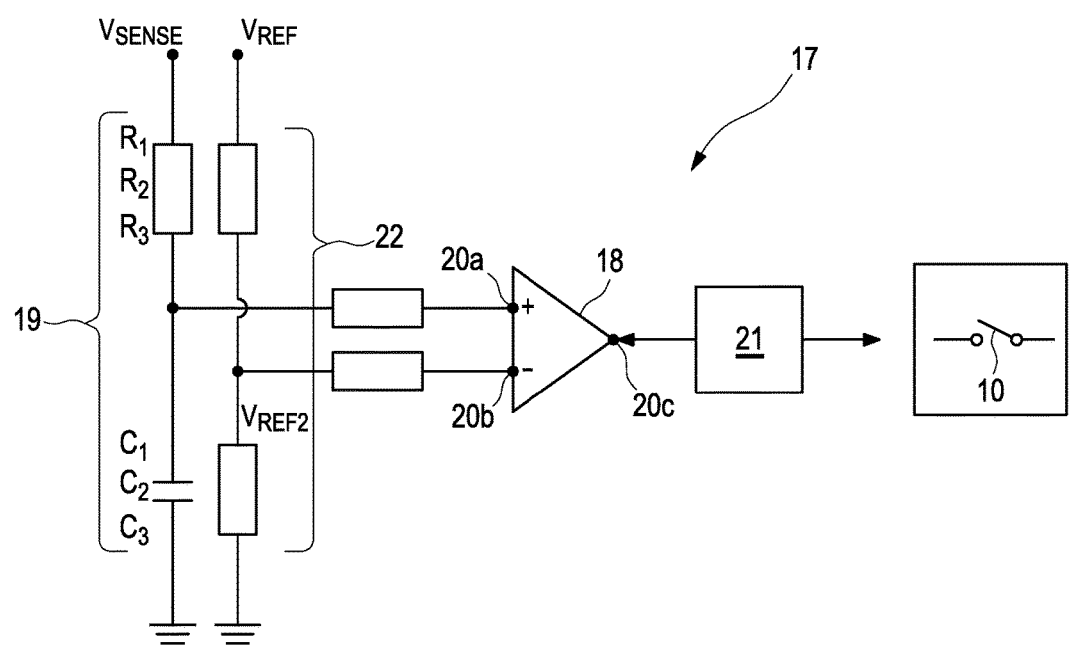
FIG. 3 shows a circuit diagram of a comparator circuit as part of the circuit arrangement.

In order to keep the number of components required for realising the first and third circuits 11, 13 and the associated production effort as low as possible, the three circuits 11, 12, 13 may each comprise a comparator circuit 17 shown in FIG. 3, which by comparing a predefined reference voltage signal $V_{REF}$ with the electric sensor output voltage $V_{SENSE}$ provided at the current sensor 14 generates an electric voltage signal, when the electric current flowing through the first supply line 2 exceeds a predefined first threshold value. The predefined reference voltage signal may for example be a conventional 5V supply voltage modified by means of a conventional voltage divider. The supply voltage may be converted into the desired reference voltage signal by means of the appropriately dimensioned voltage divider. The comparator circuits 17 associated with the three circuits 11, 12, 13 differ from one another on the one hand, by the previously mentioned reference voltage signal, which for each of the three circuits 11, 12, 13 is configured such that the comparator circuit 17, when the respective threshold value ($I_1$, $I_2$, $I_3$) of the electric current associated with the three circuits 11, 12, 13 is exceeded, the respective threshold value of the electric current I through the first electrical supply line 2 generates the first voltage signal on the output side, which then leads to the switch-over of the switching element 10 by the respective circuit of the three circuits 11, 12, 13.

In all other cases however, a second electric voltage signal is generated which is different from the first. The first electric voltage signal may for example be a first voltage level $V_1$, the second electric voltage signal may be a second signal level $V_2$. Technically speaking the comparator circuit 17 is realised with the aid of a comparator component 18, such as an operational amplifier, which is connected with a first input connection 20a with an output connection of the current sensor at which the sensor output voltage $V_{SENSE}$ is provided. Via a second input connection 20b the comparator component 18 is connected with a reference voltage source, at which the reference voltage $V_{REF}$ is provided. This can be reduced to a desired value $V_{REF2}$ by means of a conventional voltage divider circuit 22, which value represents the threshold voltage as such for the comparator component 18. By means of a circuit logic marked 21, which on the input side cooperates with the output connection of the comparator component 18 and on the output side cooperates with the switching element 10, and which is shown in FIG. 3 in an abstract way, the switching element 10 is switched over into the opened state permanently by the first and third circuits 11, 13, but only briefly by the second circuit 12, as soon as the first voltage signal $V_1$ is generated at the output connection 20c. Electrically preceding the first input connection 20a is a low-pass filter 19 of the comparator component 18, which acts as a low-pass upon the sensor output signal $V_{SENSE}$ generated by the current sensor 14. This permits the filtering out of any high-frequency components from the electric current through the supply line 2, which have nothing to do with a possible glow ignition. Such a low-pass filter 19 may be realised in the form of a RC member shown in FIG. 1 and known to the expert, wherein a cut-off frequency, at which the filter begins to act as a low-pass, can be set by a suitable dimensioning of the ohmic resistance R and the capacity C of the RC member.

The RC member in the first circuit 11 comprises a capacity $C_1$ of 1 µF and an ohmic resistance $R_1$ of 100 kOhm, the RC member in the second circuit 12 comprises a capacity $C_2$ of 100 pF and an ohmic resistance $R_2$ of 1 kOhm. The RC member in the third circuit 13 comprises a capacity $C_2$ of 1 nF and an ohmic resistance $R_3$ of 10 kOhm.

The invention claimed is:

1. An electronic circuit arrangement for use in a potentially explosive atmosphere, comprising:
   a first supply line and a second supply line that are connectable with an electric energy supply unit at a first supply line input connection and a second supply line input connection, the first supply line and the second supply line electrically connectable at a first supply line output connection and a second supply line output connection with an external electronic device for the supply of electric energy;
   a switching element provided in the first supply line wherein the switching element can be switched between an opened state where the switching element electrically interrupts flow of an electrical current in the first supply line, and a closed state where the electrical current flows uninterrupted;
   a first electronic circuit configured to switch the switching element over from the closed state into the opened state when the electric current flowing through the first supply line exceeds a predefined first threshold value for at least a predefined first switch-over time duration;
   a second electronic circuit configured to switch the switching element over from the closed state into the opened state when the electric current flowing through the first supply line exceeds a predefined second threshold value and upon the electric current falling below the second threshold value switches the switching element from the opened state into the closed state;
a third electronic circuit configured to switch the switching element over from the closed state into the opened state in response to the electric current flowing through the first supply line exceeding a third threshold value for a predefined third switch-over time duration; and
wherein the third threshold value is greater than the first threshold value and smaller than the second threshold value.

2. The electronic circuit arrangement according to claim 1, wherein:
the switching element is switched over from the closed state into the opened state via the second circuit within a second switch-over time duration, the second switch-over time duration being smaller than the first switch-over time duration of the first circuit for switching the switching element into the opened state; and
the switching element is switched over from the closed state into the opened state via the third circuit within the third switch-over time duration, the third switch-over time duration being smaller than the first switch-over time duration and greater than the second switch-over time duration.

3. The electronic circuit arrangement according to claim 2, wherein at least one of:
the first switch-over duration is between 300 ms and 1 s,
the second switch-over duration is fixed such that the electric energy transmitted during the second switch-over duration does not exceed 40 µJ, and
the third switch-over duration is approx. 40 ms.

4. The electronic circuit arrangement according to claim 1, wherein at least one of:
the first threshold value is between 1 A and 1.4 A,
the second threshold value is approx. 6 A, and
the third threshold value is approx. 2.5 A.

5. The electronic circuit arrangement according to claim 1, further comprising an electric current sensor provided in the first supply line, wherein the electric current sensor is configured to determine the electric current flowing through the first supply line and provide an electric sensor output voltage corresponding with the measured electric current.

6. The electronic circuit arrangement according to claim 5, wherein at least one of the first circuit, the second circuit and the third circuit includes a comparator circuit, the comparator circuit configured to compare a predetermined reference voltage signal with the sensor output voltage provided by the current sensor, and generate a first electric voltage signal when the electric current flowing through the first supply line exceeds a predetermined comparator threshold value, and generate a second electric voltage signal which is different from the first electric voltage signal when the electric current flowing through the first supply line does not exceed the predetermined comparator threshold value.

7. The electronic circuit arrangement according to claim 6, wherein
the comparator circuit respectively includes a comparator component, the comparator component connected via a first input connection with an output connection of the current sensor, at which a sensor output voltage is provided, and the comparator component connected via a second input connection with a reference voltage source, at which a reference voltage is provided, and
the comparator circuit includes a first circuit logic which on an input side cooperates with an output connection of the comparator component and on an output side cooperates with the switching element, wherein the first circuit logic switches the switching element from the closed state into the opened state, if the first voltage signal is present at the output connection.

8. The electronic circuit arrangement according to claim 6, wherein the comparator circuit includes a comparator component having a first input connection and a second input connection, the comparator circuit including a low-pass filter provided at the first input connection of the comparator component, which acts as a low-pass upon a sensor output signal provided by the current sensor to filter out high-frequency components from the electric current.

9. The electronic circuit arrangement according to claim 8, wherein the low-pass filter is configured as a RC member.

10. The electronic circuit arrangement according to claim 9, wherein at least one of:
the RC member is provided in the first circuit and includes a capacity of approx. 1 µF and an ohmic resistance of approx. 100 kOhm,
the RC member is provided in the second circuit and includes a capacity of approx. 100 pF and an ohmic resistance of approx. 1 kOhm, and
the RC member is provided in the third circuit and includes a capacity of approx. 1 nF and an ohmic resistance of approx. 10 kOhm.

11. An electronic module, comprising:
an electrical circuit arrangement including:
a first supply line having a first supply line input connection and a first supply line output connection, and a second supply line having a second supply line input connection and a second supply line output connection, wherein the first supply line and the second supply line are connectable with an external electronic device for supplying electric energy via the first supply line output connection and the second supply line output connection;
a switching element provided in the first supply line, the switching element switchable between an opened state where an electrical current flow in the first supply line is interrupted, and a closed state where the electrical current flows uninterrupted;
a first electronic circuit configured to switch the switching element from the closed state to the opened state when the electric current flowing through the first supply line exceeds a predefined first threshold value for at least a predefined first time duration;
a second electronic circuit configured to switch the switching element from the closed state to the opened state when the electric current flowing through the first supply line exceeds a predefined second threshold value and switch the switching element from the opened state to the closed state when the electric current falls below the second threshold value, wherein switching the switching element from the closed state to the opened state occurs within a second time duration smaller than the first time duration;
a third electronic circuit configured to switch the switching element from the closed state to the opened state in response to the electric current flowing through the first supply line exceeding a third threshold value for a predefined third time duration, wherein the third threshold value is greater than the first threshold value and smaller than the second threshold value;

an electric current sensor provided in the first supply line, wherein the electric current sensor is configured to determine the electric current flowing through the first supply line and provide an electric sensor output voltage corresponding with the electric current; and an electric energy supply unit electrically connected with the electrical circuit arrangement via the first supply line input connection and the second supply line input connection.

12. The electronic module according to claim 11, wherein at least one of the first circuit, the second circuit and the third circuit includes a comparator circuit, the comparator circuit respectively configured to:

compare a predetermined reference voltage signal with the electric sensor output voltage provided via the current sensor, generate a first electric voltage signal when the electric current flowing through the first supply line exceeds a predetermined comparator threshold value; and generate a second electric voltage signal different from the first electric voltage signal when the electric current flowing through the first supply line falls below the predetermined comparator threshold value.

13. The electronic module according to claim 12, wherein the comparator circuit respectively includes a comparator component having a first input connection, a second input connection, and an output connection;

the first input connection is connected with an output connection of the current sensor at which a sensor output is provided; and the second input connection is connected with a reference voltage source at which a reference voltage is provided.

14. The electronic module according to claim 13, wherein the comparator circuit includes a first circuit logic having an input side cooperating with the output connection of the comparator component and an output side cooperating with the switching element, wherein the first circuit logic switches the switching element from the closed state to the opened state if the first voltage signal is present at the output connection of the comparator component.

15. The electronic module according to claim 14, wherein the comparator circuit includes a low-pass filter provided at the first input connection of the comparator component, wherein the low-pass filter acts as a low-pass upon the sensor output signal provided via the current sensor to filter out high-frequency components from the electric current.

16. An electronic system, comprising:
an electronic module including:
a first supply line having a first supply line input connection and a first supply line output connection, and a second supply line having a second supply line input connection and a second supply line output connection, wherein the first supply line input connection and the second supply line input connection are connected with an electric energy supply unit;

a switching element provided in the first supply line, the switching element switchable between an opened state in which an electrical current flow in the first supply line is interrupted and a closed state in which the electrical current flows uninterrupted;

a first electronic circuit configured to switch the switching element from the closed state to the opened state when the electric current flowing through the first supply line exceeds a predefined first threshold value for at least a predefined first time duration;

a second electronic circuit configured to switch the switching element from the closed state to the opened state when the electric current flowing through the first supply line exceeds a predefined second threshold value, wherein the second electronic circuit is configured to switch the switching element from the opened state to the closed state when the electric current falls below the second threshold value;

a third electronic circuit configured to switch the switching element from the closed state to the opened state in response to the electric current flowing through the first supply line exceeding a third threshold value for a predefined third time duration, wherein the third threshold value is greater than the first threshold value and smaller than the second threshold value;

an electronic device connected with the first supply line output connection and the second supply line output connection of the electronic circuit arrangement for supplying electrical energy; and wherein switching the switching element from the closed state to the opened state via the second circuit occurs within a second time duration less than the first time duration, and switching the switching element from the closed state to the opened state via the third circuit occurs within the third time duration, and wherein the third time duration is less than the first time duration and greater than the second time duration.

17. The electronic system according to claim 16, wherein at least one of the first time duration is between 300 ms and 1 s, and the third time duration is approximately 40 ms.

18. The electronic system according to claim 17, wherein at least one of (i) the first threshold value is between 1 A and 1.4 A, (ii) the second threshold value is approximately 6 A, and (iii) the third threshold value is approximately 2.5 A.

* * * * *